June 25, 1946.     C. C. WILLIAMS     2,402,699
STEAM ENGINE
Filed May 26, 1943     4 Sheets-Sheet 3
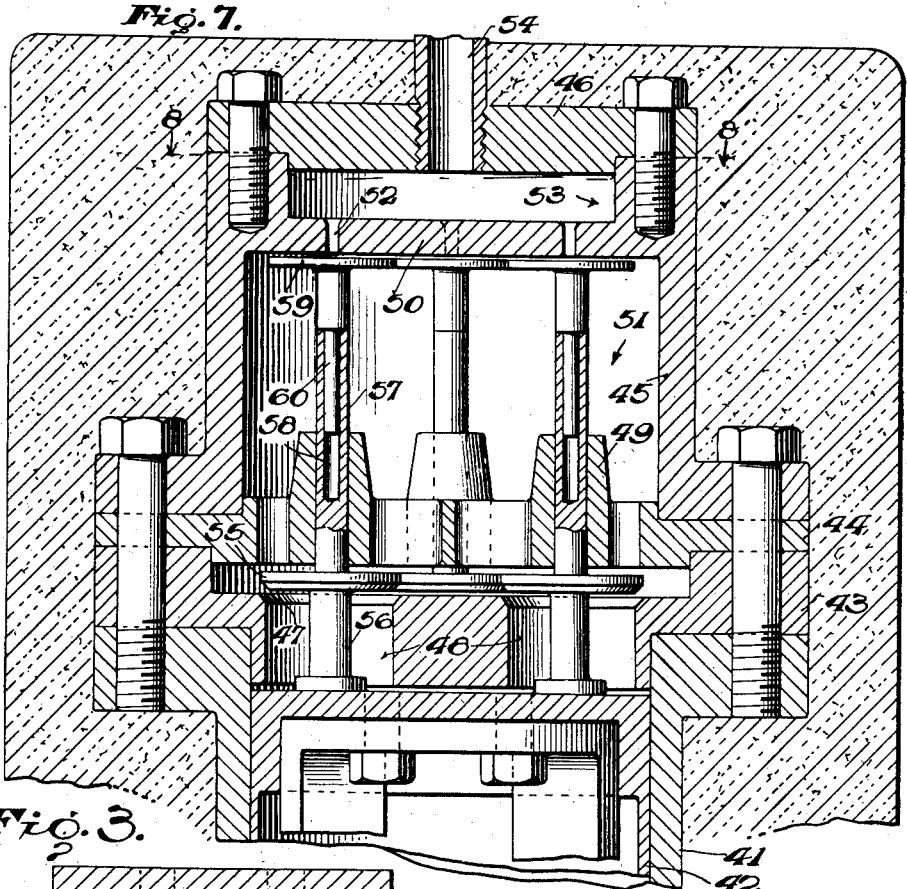
Fig. 7.
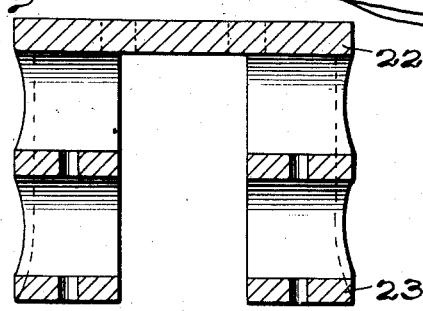
Fig. 3.
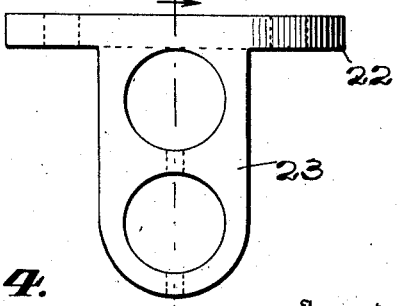
Fig. 5.
Fig. 4.
Inventor
Calvin C. Williams.
By Thos. H. Johnston
Attorney June 25, 1946.  C. C. WILLIAMS  2,402,699
STEAM ENGINE
Filed May 26, 1943  4 Sheets-Sheet 4

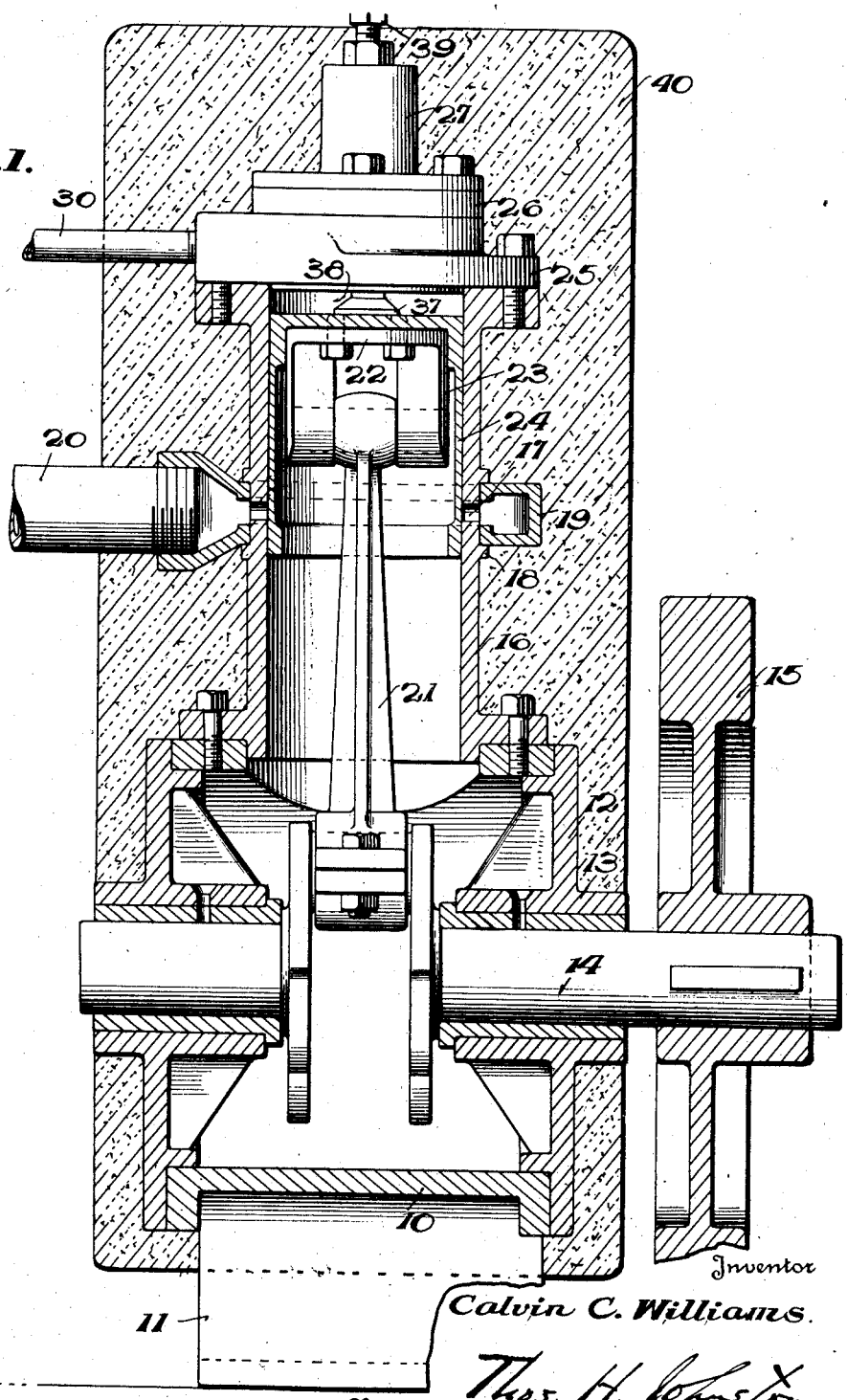

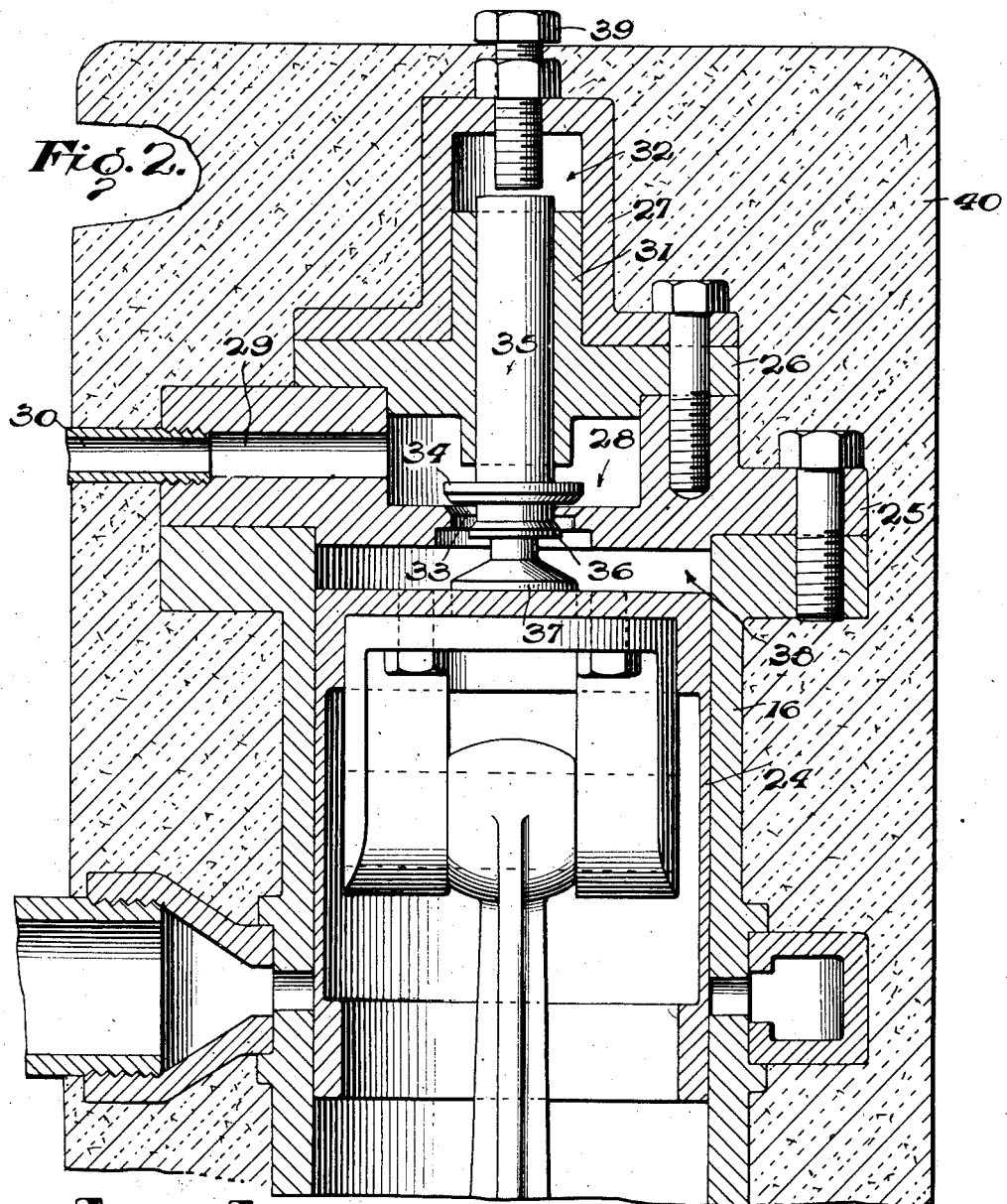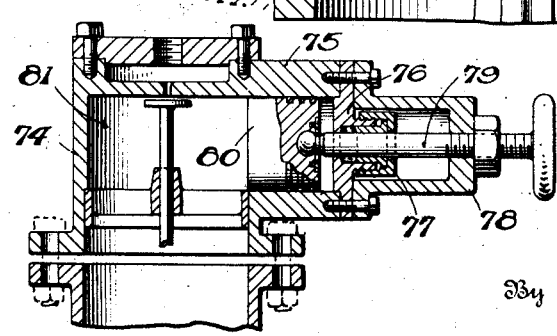

Inventor
Calvin C. Williams.
By Thos. H. Johnston
Attorney

Patented June 25, 1946

2,402,699

UNITED STATES PATENT OFFICE 2,402,699

STEAM ENGINE

Calvin C. Williams, Philadelphia, Pa.

Application May 26, 1943. Serial No. 488,598

1 Claim. (Cl. 121—125)

This invention relates to an improved steam engine and more particularly to an engine wherein, after exhaust, residual steam in the cylinder is compressed by the piston, the present application being based on the same invention disclosed in my abandoned application filed August 3, 1940, Serial No. 350,783.

It has been discovered that when superheat, in appreciable degree, is present in the exhaust steam, the temperature rise in a clearance volume of steam, as it is compressed by the piston, is very great, without a comparable rise in compression pressure. Furthermore, it has been discovered that the heat jump becomes progressively more pronounced with increase of the boiler pressure and rise in superheat temperature of the exhaust steam. It has also been discovered that the efficiency rises as the compression pressure of the clearance volume of steam is made to approach the operating pressure of the feed steam while maximum efficiency is realized when the compression pressure is substantially equal to the operating pressure.

The present invention is therefore predicated, primarily, to operate under a superheated steam cycle wherein superheat is present in the steam throughout the cycle of the engine. As the operating pressure may be actual boiler pressure or less, depending upon conditions produced by throttle, a large clearance space is necessary, in any event, to provide a sufficiently large clearance volume of steam at a sufficiently high temperature to raise the temperature of the feed charge of steam and maintain, at cut-off, a temperature of the composite mixture above boiler pressure temperature of the feed steam. A correspondingly greater heat drop will accordingly be realized at expansion while, however, superheat will be realized in the exhaust steam. A steam valve automatically responsive to operating pressure has been found of great assistance, as such a valve will, in response to pressure fluctuations produced by throttle, automatically measure and restrict the admission of feed steam to the cylinder to a minimum volume such that the composite mixture of admitted feed steam and clearance volume steam will retain a temperature, at cut-off, greater than the boiler pressure temperature.

It is therefore an object of the present invention to provide an engine wherein by efficiently utilizing to heat a charge of feed steam, the unexpected regenerated heat realized by compressing superheated exhaust steam, the temperature of the composite charge of steam, at cut-off, will be such that superheat in appreciable degree will remain in the resultant exhaust steam, whereby the efficiency of the engine will be greatly increased with corresponding use of less feed steam for given work and corresponding economy of water and fuel.

A further object of the invention is to provide an engine having a large clearance volume of steam of a compression pressure not greater than the operating pressure of the feed steam but of high compression temperature.

Another object of the invention is to provide an engine wherein feed water may be introduced into a boiler at higher temperatures than heretofore.

Other and incidental objects of the invention will appear during the course of the following description, and in the drawings:

Figure 1 is a transverse vertical section through an engine embodying the present invention, the cylinder head being shown in elevation.

Figure 2 is an enlarged transverse vertical section through the upper end of the cylinder and cylinder head.

Figures 3, 4 and 5 are, respectively, a detail section, bottom plan and side elevation of the head employed to carry the piston.

Figure 7 is a transverse vertical section showing a variation of the invention.

Figure 10 is a transverse vertical section showing a variation which may be embodied in the construction of Figures 7 and 8, or the construction of Figure 9.

Figure 9:
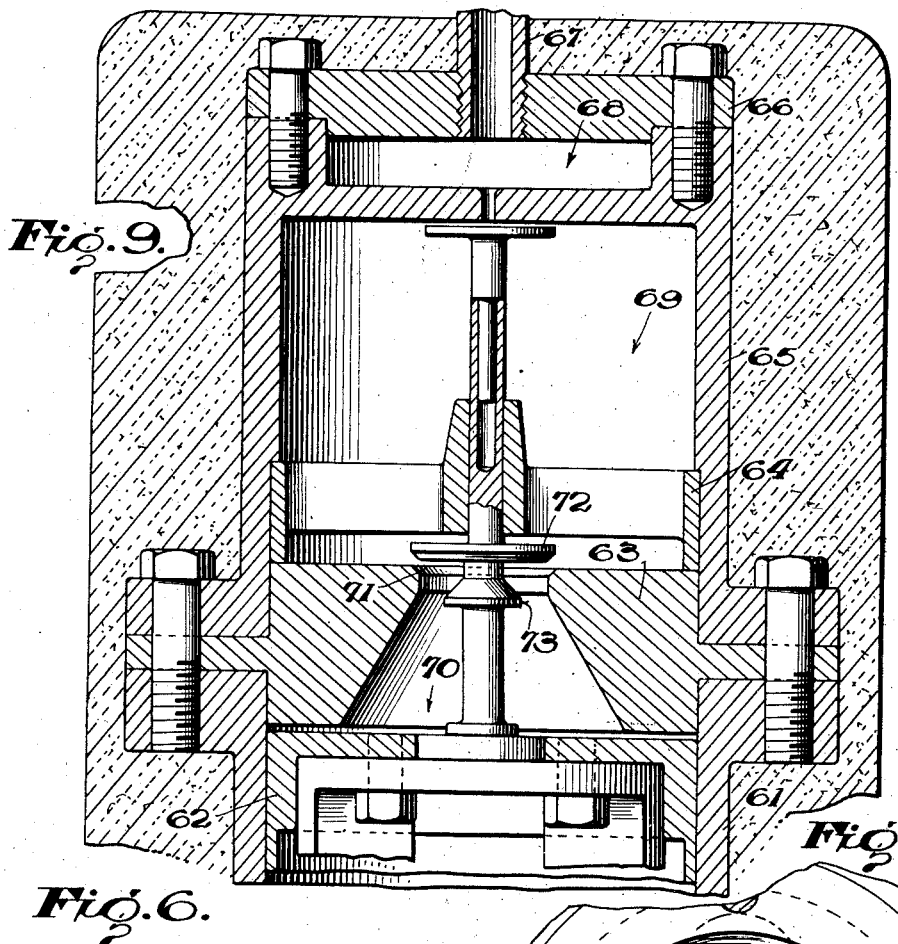
Figure 9 is a transverse vertical section showing a further variation of the invention.

Referring now more particularly to Figures 1 to 6 of the drawings, I have shown a uniflow engine embodying a crank case 10 preferably having legs 11 and closed by heads 12. The heads carry bearings 13 which journal a crank shaft 14, and fixed to the crank shaft is a fly wheel 15. Any suitable means may be provided for starting the crank shaft to turn in the direction desired or for reversing the direction of rotation of said shaft.

Figure 6:
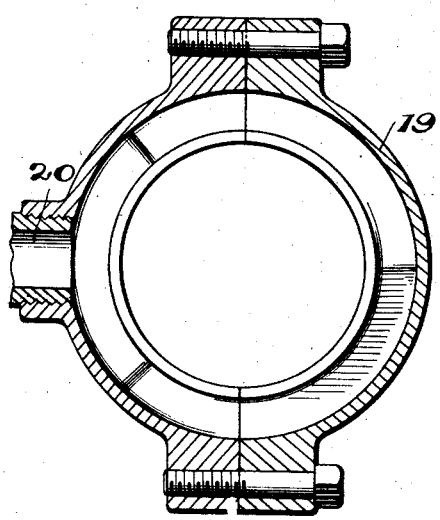
Figure 6 is a horizontal section showing the exhaust manifold.

Fixed to the crank case is a cylinder 16 provided with a series of circumferentially spaced exhaust ports 17, above and below which the cylinder is formed with flanges 18, and fitting between said flanges, as best seen in Figure 6, are the mating, detachably connected sections of an exhaust manifold 19 to which may be connected an exhaust pipe 20.

Attached to the crank pin of the crank shaft 14 is a connecting rod 21 which, at its smaller end, carries a head 22 having depending legs 23 snugly straddling said end of the rod, and connecting the head with the rod is a suitable wrist pin mounted by said legs. As seen in Figures 3 and 5 of the drawings, the legs are apertured above the wrist pin bearings to reduce weight. Detachably bolted to the head 22 is a piston 24 fitting over the head and slidably coacting with the wall of the cylinder 16.

Removably secured to the cylinder 16 is a head assembly comprising a valve seat plate 25, a valve guide plate 26 and a cap 27. The plate 25 fits the cylinder and is recessed at its upper side to provide a chest chamber 28 entering which is a duct 29 to which latter may be attached a pipe 30 for conducting feed steam to said chamber. Any suitable throttle may be provided for controlling the flow of steam through said pipe. The plate 26 mates with the plate 25 and is provided with a sleeve 31 over the upper end of which the cap 27 removably fits, mating therewith. Above the upper end of the sleeve 31 within the cap 27 is a differential pressure chamber 32.

The plate 25 is provided with a valve seat 33 and movable to cooperate with said seat is a steam valve 34 having a stem 35 slidable in the sleeve 31. Centered below the valve 34 is a spreader 36 for mixing feed steam from the chamber 28 with steam in the upper end of the cylinder, and depending below the spreader is a foot 37 engageable by the piston 24 as it nears top center for lifting and thus opening the valve 34.

As will be observed, a compression chamber 38 is provided between the piston and the plate 25 when the piston is at top center and this space accommodates the foot 37. Screwed through the upper end of the cap 27 is an adjustable stop bolt 39 which preferably carries a lock nut.

Normally, the pressure in the chamber 32 will be identical with the prevailing pressure in the chamber 28 but, as will be observed, the bolt 39 is, as shown in Figure 2, positioned away from the stem 35 of the valve 34 when the valve is full open. When the engine is first started and running slowly, the valve will follow the piston, being opened as the piston ascends and allowed to close as the piston descends. Feed steam in the chamber 28 will accordingly be admitted to the compression chamber 38. However, as the speed of the engine is increased, the kinetic energy of the valve unit will cause the stem 35 to strike the stop-bolt 39 and, due to the sudden upward movement of the stem, increase the pressure in the chamber 32. Thus, notwithstanding this increase of pressure in the chamber 32, closing of the valve will be blocked by the piston while near top center, either at one side thereof or the other, but as the piston recedes, the pressure in the chamber 38 will, obviously, be caused to gradually drop. Accordingly, when the pressure in the compression chamber 38 reaches a point below the pressure in the chamber 32, the valve will be closed by the pressure in the latter chamber acting on the valve stem 35. As the valve nears its seat, steam rushing past the valve into the enlarging chamber 38, as the piston 24 descends, will snap the valve shut to afford quick cut-off.

As will be perceived, the foregoing operation of the valve 34 will ensue regardless of any change in the operating pressure of steam in the chamber 28, as may be caused by throttle, and thus, the valve will respond to actual operating pressure in said chamber and automatically control cut-off accordingly. For any given decreased operating pressure in the chamber 28, the closing of the valve will be delayed and conversely, for any given increased operating pressure in said chamber, the closing of the valve will be advanced. Feed steam to the chamber 38 will thus be measured to a minimum responsive to operating pressure in the chamber 28. The purpose of this construction is to admit as little new steam as possible, which means less water and less fuel, and take full advantage of the regenerated heat in the steam in the compression chamber 38.

The compression chamber 38 is proportioned in relation to boiler pressure, displacement and compression ratio to afford a large clearance volume of steam at a compression pressure not greater than boiler pressure of the feed steam. For instance, the compression pressure may range, in terms of percentages, from .5 to .75 of the boiler pressure but, as has been found, efficiency increases as the compression pressure is caused to approach boiler pressure while maximum efficiency is realized when the compression pressure is substantially equal to boiler pressure. The piston displacement will, of course, be proportioned in relation to the horse-power which the engine is intended to develop and for the purposes of the present disclosure, the boiler pressure may be considered as a maximum operating pressure in the chamber 28 at full open throttle.

To illustrate: assume a boiler pressure of 500 pounds absolute in the chamber 28 and a temperature of the feed steam of about 725 to 998 degrees, it has been found that the clearance volume should be, in terms of percentages of displacement, about 7 to 14.5, based on a compression ratio of about 15.2 to 8. These values have been found to afford a temperature of the exhaust steam of about 220 to 360 degrees which, according to recognized steam charts, represents about 7 to 147 degrees of superheat. Furthermore, these values have been found to afford a compression pressure of the clearance volume of steam of about 235 to 500 pounds absolute, or from boiler pressure to about 265 pounds less than boiler pressure. Exhaust steam at a superheated temperature of about 220 to 360 degrees has been found to have a temperature, when compressed to 235 to 500 pounds, of about 820 to 1340 degrees, which represents a thermal gain in the clearance volume of steam of about 600 to 980 degrees, the clearance volume of steam being 95 to 342 degrees hotter than the feed steam in the chamber 28. Experiment has demonstrated that, under the values given, the volume of steam in the clearance space 38 is sufficiently large and of sufficiently high temperature, when compressed to the pressure stated, to raise the temperature of the steam admitted to the cylinder while the valve 34 is open, so that the steam in the cylinder, at cut-off, will be at a temperature above the feed steam and high enough to substantially realize the stated value of superheat in the exhaust steam. The engine will thus maintain a superheated steam cycle throughout the cycle of the engine.

For a boiler pressure of 800 pounds absolute, the compression ratio is slightly raised to about 21.8 to 8.7 while the clearance volume, in percentages of displacement, is reduced to 4.8 to 13. For a boiler pressure of 1000 pounds absolute, the compression ratio is again slightly raised to 26 to 8.8 while the clearance volume, in percentages of displacement, is reduced to 4 to 13. In each instance, these values will afford an engine which will maintain a margin of superheat in the exhaust steam comparable to the specific illustration traced. It will be observed that as the boiler pressure is increased, the clearance volume may be decreased with but slight rise in compression ratio. This is due to the fact that, as has been found, the heat jump in the compressed clearance volume of steam becomes progressively more pronounced with rise in boiler pressure and reflected rise in superheat temperature of the exhaust steam. Preferably, a heat retaining jacket 40 for the engine is employed so that the engine may operate at the highest temperature feasibly attainable. The jacket may be of asbestos or other suitable material.

In connection with the foregoing, it is to be noted that while the closing of the steam valve of the engine is automatic still, it has been found that the cut-off will occur early rather than late. In fact, it may be said that the engine will operate at early cut-offs precluding forced creation of superheat in the exhaust steam by over-prolonged admission of feed steam.

Figure 8:
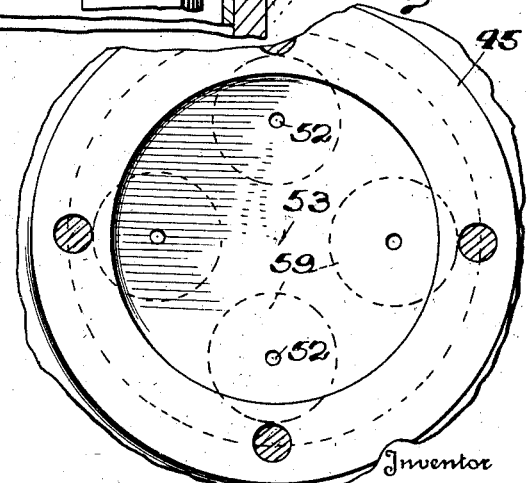
Figure 8 is a detail section on the line 8—8 of Figure 7 and showing the location of the valves.

In Figures 7 and 8 of the drawings, I have shown a variation of the invention. The cylinder is indicated at 41 and the piston at 42, these parts being identical with the corresponding parts previously described.

Removably bolted to the cylinder is a head assembly comprising a valve seat plate 43, a valve guide plate 44, a cap 45 and a cover 46. The plate 43 is formed with seats 47 and is thickened so that the combined passages below said seats provide a compression chamber 48, like the chamber 38. The plate 44 is formed with guide sleeves 49 while the cap 45 is provided with a top wall 50 defining a differential pressure chamber 51 within the cap. Formed in said wall are steam ducts 52 and defined between the wall 50 and the cover 46 is a chest chamber 53 for feed steam. Secured to said cover is a feed pipe 54.

Mounted by the plate 44 are steam valves 55 to coact with the seats 47 and depending from said valves are feet 56 engageable by the piston, as in the prior embodiment of the invention, for opening the valves. Rising from the valves are stems 57 slidable through the sleeves 49 and provided with sockets 58, while at the upper ends of the stems are affixed flat, disk-shaped caps 59 having pins 60 received in said sockets. The pins may be fixed in the sockets or have a close sliding fit therein such that any individual upward movement of the caps will create suction in the sockets 58 below the pins for limiting displacement of the pins so that each cap and valve will move as a unit. As will be observed, the caps 59 are centered with respect to the ducts 52.

In this variation of the invention, it is not only necessary to take into account the factors of boiler pressure, displacement and compression ratio, as heretofore outlined, but also the factor of the volume of the differential pressure chamber 51. The volume of this chamber will preferably range, in terms of percentages, from about .6 to .8 of the displacement. It has been found that if the chamber is too large, the valves will close too late and conversely, if too small, the valves will close too soon.

As the piston 42 ascends, the valves 55 will be opened thereby, as previously explained. Should the kinetic energy tend to open the valves more than the lift due to piston movement, the caps 59 will retard or stop the opening movement of the valves while should the pressure in the chamber 48 exceed the pressure in the chamber 53, the caps will seal the ducts 52. Ordinarily, the caps will momentarily hold the valves open, due to the rush of steam through the ducts across the upper faces of the caps with resultant reduction of pressure at the upper sides of the caps. As the piston 42 moves down, however, and the pressure in the chamber 51 gradually drops, the decreased pressure on the lower sides of the caps and the increased velocity of the steam entering through the ducts 52 trying to raise the pressure in said chamber, will act on the caps to close the valves. As the valves are almost closed, the velocity of the steam past the valves will snap the valves shut to afford quick cut-off.

In Figure 9 of the drawings, I have shown a further variation of the invention which is much the same as the construction shown in Figures 7 and 8 except that a single steam valve is employed. The cylinder is indicated at 61 and the piston at 62, as disclosed in the prior embodiment. Detachably secured to the cylinder is a head assembly comprising a seat plate 63, guide plate 64, cap 65 and cover 66. The feed pipe is indicated at 67, the chest chamber at 68, the differential pressure chamber at 69 and the compression chamber at 70, the plate 63 being thickened to provide the latter chamber. At the upper end of the chamber 70 is a seat 71 and cooperating with said seat is a valve indicated as a whole at 72, this valve constituting a unit identical with any one of the valve units shown in Figures 7 and 8 of the drawings except that immediately below the valve disk of the valve 72 is provided a spreader 73. The salient difference in the construction over the construction shown in Figures 7 and 8 lies in the fact that the compression chamber 70 is formed by a single recess in the plate 63 and the spreader 73 will afford better mixing of the feed steam with the clearance volume of compressed steam in said chamber. As will be noted, the plate 64 is in the nature of a spider locked beneath an internal shoulder in the cap 65. Otherwise, the construction is substantially identical with the variation of Figures 7 and 8 and operates in like manner.

In Figure 10 of the drawings, I have shown a modification which may be employed in conjunction with the construction of Figures 7 and 8, or the construction of Figure 9. As will be observed, the cap 74 of the cylinder head assembly is provided at one side with a cylinder 75 closed by a plate 76 carrying a gland 77, and housing the gland is a cap 78 through which is adjustable a shaft 79 on the inner end of which latter is swiveled a piston 80 movable forwardly or rearwardly for decreasing or increasing the effective volume of the differential chamber 81 provided by the cap. Thus, as will be appreciated in view of the foregoing description, the piston may be manually adjusted for increasing the effective volume of the chamber 81 so that closing of the steam valve or valves, as the case may be, will be delayed when the engine is started and picking up speed while, after the engine has gained speed, the piston may be adjusted for decreasing the effective volume of said chamber and advancing the closing of the valve or valves to thus economize feed steam.

Having thus described my invention, what I claim is:

The method of propagating a superheated steam cycle in a prime mover utilizing feed steam and operating at early cut-offs precluding forced creation of superheat in the exhaust steam by over-prolonged admission of feed steam which consists in compressing superheated exhaust steam to form a compression volume of steam of a temperature higher than the temperature of the feed steam, feeding feed steam into said compression volume of steam to be heated thereby and form a mixture of feed and compression volume steam of a temperature at cut-off above the temperature of the feed steam, and expanding down to point of release with the exhausting steam mixture containing superheat.

CALVIN C. WILLIAMS.